United States Patent
Prusak et al.

(10) Patent No.: US 12,196,035 B2
(45) Date of Patent: Jan. 14, 2025

(54) HOLLOW ACRYLIC SOLID SURFACE SEAMLESS DOOR

(71) Applicant: Prusak's Precision Construction, Inc., North Royalton, OH (US)

(72) Inventors: Thomas Prusak, North Royalton, OH (US); Colin Jones, Medina, OH (US)

(73) Assignee: PRUSAK'S PRECISION CONSTRUCTION, INC., North Royalton, OH (US)

( * ) Notice: Subject to any disclaimer, the term of this patent is extended or adjusted under 35 U.S.C. 154(b) by 552 days.

(21) Appl. No.: 17/319,278

(22) Filed: May 13, 2021

(65) Prior Publication Data

US 2021/0355747 A1  Nov. 18, 2021

Related U.S. Application Data

(60) Provisional application No. 63/024,663, filed on May 14, 2020.

(51) Int. Cl.
| | | |
|---|---|---|
| *E06B 3/82* | (2006.01) | |
| *B29C 65/00* | (2006.01) | |
| *E06B 3/86* | (2006.01) | |
| *G07C 9/00* | (2020.01) | |

(52) U.S. Cl.
CPC ............ *E06B 3/822* (2013.01); *B29C 65/002* (2013.01); *E06B 3/86* (2013.01); *G07C 9/00563* (2013.01)

(58) Field of Classification Search
CPC .... E06B 3/822; E06B 3/86; E06B 2003/7074; E06B 2003/7046; E06B 2003/26352; E06B 3/12; E06B 3/726; E06B 3/78; B29C 65/002; G07C 9/00563
See application file for complete search history.

(56) References Cited

U.S. PATENT DOCUMENTS

| | | | | |
|---|---|---|---|---|
| 2,948,366 | A * | 8/1960 | Kelly | E06B 3/822 49/501 |
| 5,417,029 | A * | 5/1995 | Hugus | E06B 3/822 49/501 |
| 8,136,327 | B1 * | 3/2012 | Sokol | E06B 3/822 52/656.1 |
| 8,171,700 | B2 * | 5/2012 | Barnes | E06B 1/16 52/745.15 |
| 8,418,427 | B2 * | 4/2013 | Strickland | E06B 3/822 52/404.3 |
| 8,534,027 | B1 * | 9/2013 | Cullinane | E06B 3/726 52/784.15 |
| 9,830,790 | B2 * | 11/2017 | Jones | H04N 7/186 |
| 10,119,694 | B2 * | 11/2018 | Ellis | F21V 33/006 |
| 10,704,317 | B2 * | 7/2020 | Strickland | E06B 3/76 |

(Continued)

FOREIGN PATENT DOCUMENTS

| | | | |
|---|---|---|---|
| AU | 2016102133 A4 * | 2/2017 | |
| CN | 101368469 A * | 2/2009 | |

(Continued)

*Primary Examiner* — Andrew J Triggs
(74) *Attorney, Agent, or Firm* — Dinsmore & Shohl LLP

(57) ABSTRACT

A hollow man sized door includes a core and an acrylic outer surface. The acrylic outer surface is seamless and solid. Mounting brackets are selectively attached to the core. Hardware is attached to the door at locations of the mounting bracket. Scratches or damage may be buffed out of or wiped from the acrylic outer surface.

8 Claims, 9 Drawing Sheets

(56) References Cited

U.S. PATENT DOCUMENTS

| | | | | |
|---|---|---|---|---|
| 10,721,443 | B1* | 7/2020 | Assani | G06V 40/172 |
| 11,085,226 | B2* | 8/2021 | Honjo | G07C 9/37 |
| 11,346,150 | B1* | 5/2022 | Johnston | E06B 7/32 |
| 11,802,429 | B2* | 10/2023 | Marsh | E05B 63/12 |
| 2004/0043361 | A1* | 3/2004 | Bialas | G09F 7/04 |
| | | | | 434/81 |
| 2016/0073792 | A1* | 3/2016 | Bouwman | A47F 3/0434 |
| | | | | 49/502 |
| 2020/0043271 | A1* | 2/2020 | Anderson | G07C 9/00309 |
| 2021/0355747 | A1* | 11/2021 | Prusak | G07C 9/00563 |

FOREIGN PATENT DOCUMENTS

| | | | | | |
|---|---|---|---|---|---|
| CN | 201738749 | U | * | 2/2011 | |
| CN | 205876077 | U | * | 1/2017 | |
| GB | 2401388 | A | * | 11/2004 | E06B 3/6604 |
| JP | 7279934 | B2 | * | 5/2023 | |

* cited by examiner

HOLLOW ACRYLIC SOLID SURFACE SEAMLESS DOOR

CROSS-REFERENCE TO RELATED APPLICATION

The application claims priority to U.S. Provisional Application No. 63/024,633 entitled "HOLLOW ACRYLIC SOLID SURFACE SEAMLESS DOOR," filed on May 14, 2020, which is incorporated herein by reference in its entirety

TECHNICAL FIELD

The present invention relates generally to a hollow door and, more specifically, to a hollow acrylic solid surface seamless man door.

BACKGROUND

Traditionally, doors for high use (e.g., commercial buildings) include hollow metal doors. Such hollow metal doors include face sheets of metal, typically steel. The steel may be cold-rolled, hot-rolled, galvanized, or the like. The face sheets are supported by a core between the face sheets. After the face sheets and core are assembled together, the metal door must typically be machined to form through holes for fixtures and the like. For instance, hardware can be installed on a hollow metal door by drilling straight through the metal surface. The metal doors typically require finishing such as polishing or grinding, and finally painting. Throughout the manufacturing process, the face sheets or other components may be damaged, warped by heating or welding, or the like. This may result in permanently warped doors.

Such hollow metal doors are often utilized for their strength and weight, which makes them suitable for commercial, industrial, security, or other purposes. These doors may be opened hundreds of times a day and incur damage in the form of scratching, chipping, denting and even complete removal of the paint in some areas. For instance, high use areas near handles where users push the door open and lower sections of the door where objects often collide with the door often have increased damage. Such damage leaves the doors in a condition far below visual standards. Examples of these doors are shown in FIGS. 1A and 1B, where the metal doors 100 and 110 respectively include damaged areas 102 and 112.

To correct damage, traditional approaches include users stripping off old paint and then applying new paint. This results in increased waste, time and expense, as well as reduced use of the door, as it is unusable during the stripping of the paint and application of new paint. Another option is to apply more durable paint, which increases cost while still being susceptible to damage and lost paint. Each of these approaches only temporarily resolves the issue. Eventually, the doors end up below visual standards and require replacement.

In view of the foregoing, there is a need for more efficient hollow doors that are more durable, not susceptible to lost paint, appropriately weighted, and sufficiently strong to be used in high use applications.

SUMMARY

Described herein is a hollow man door including a core comprising metal, one or more mounting brackets selectively attached to the core, wherein the one or more mounting brackets are positioned for attaching hardware to the hollow man door, and an acrylic outer surface attached to and generally encasing the core, wherein the acrylic outer surface comprises a solid seamless surface.

Further described is a method for forming a hollow man door, including forming a core of a metallic material, attaching at least one mounting brackets to the core, forming at least one conduit through the core, and seaming together a plurality of solid acrylic outer surfaces such that the core is disposed within the plurality of solid acrylic outer surfaces.

These and additional features provided by the embodiments described herein will be more fully understood in view of the following detailed description, in conjunction with the drawings.

DESCRIPTION OF THE DRAWINGS

Operation of the invention may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

In the drawings.

DETAILED DESCRIPTION

Figure 1B:
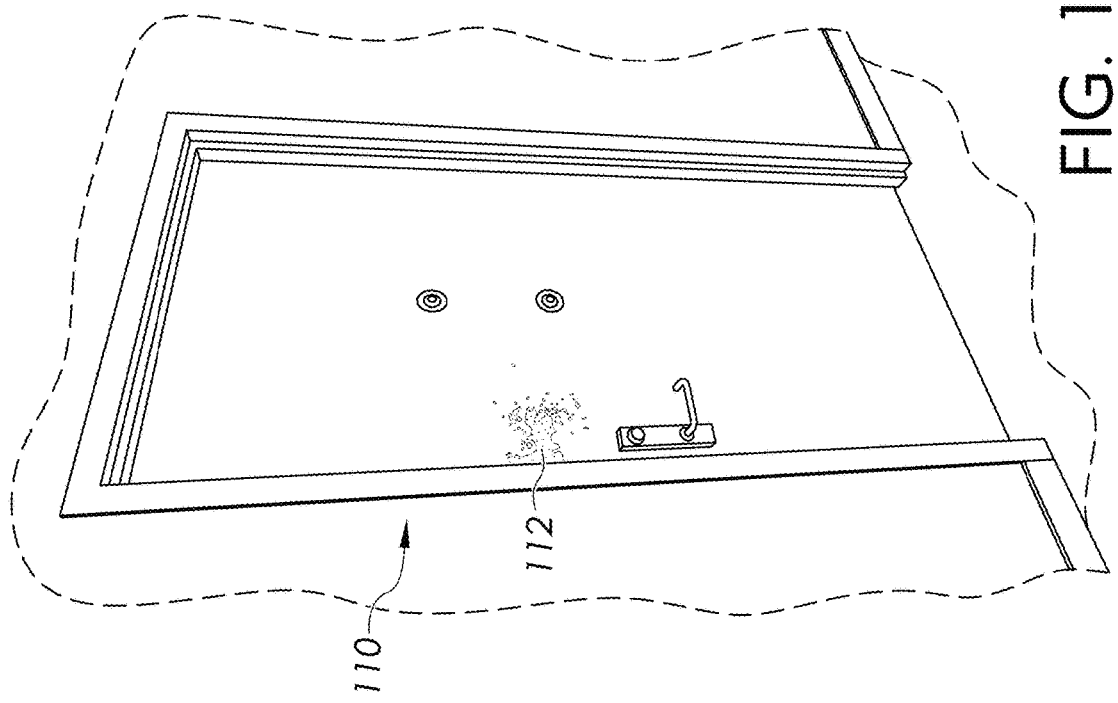
FIGS. 1A and 1B are examples of prior art hollow metal doors with damaged areas.
Figure 1A:
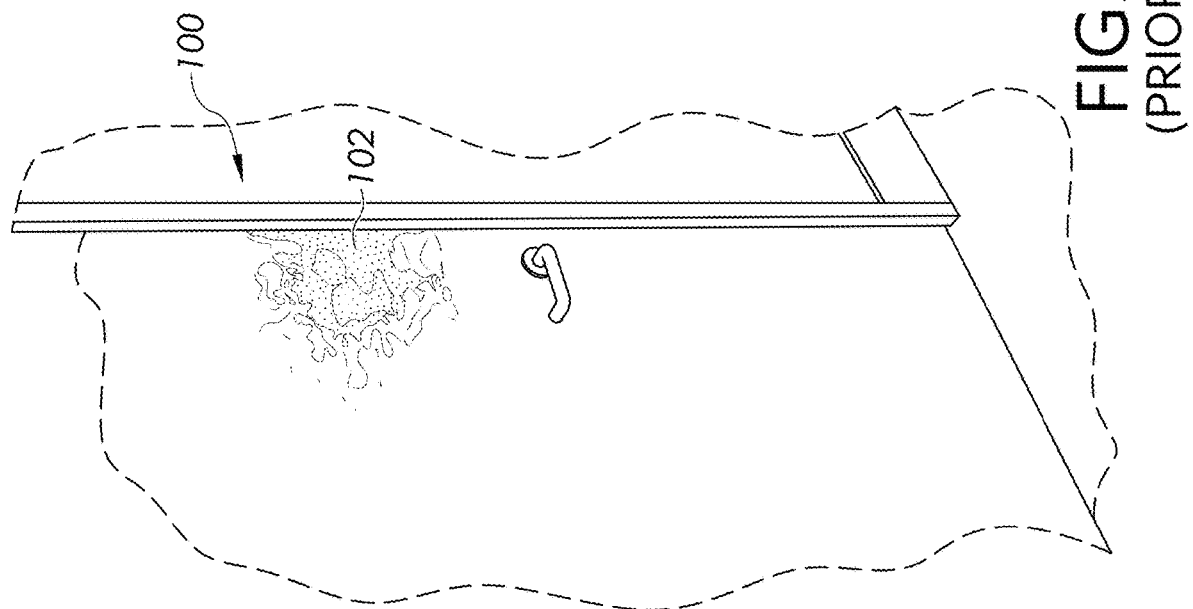

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Similar reference numerals are used throughout the figures. Therefore, in certain views, only selected elements are indicated even though the features of the assembly are identical in all of the figures. In the same manner, while a particular aspect of the invention is illustrated in these figures, other aspects and arrangements are possible, as will be explained below.

Embodiments generally include a core. The core may comprise various shapes, sizes and materials. In at least one example, the core may comprise an aluminum channel core comprising a plurality of inner cores welded together to form a frame. Mounting brackets may be placed and attached to the core at predetermined areas to provide a surface with which hardware may be attached. Mounting brackets may allow for any style door hardware, including but not limited to high security hardware with deadbolts extending out of multiple locations on the door (top, bottom, strike side), view holes, electronic components, or the like.

It is noted that in past metal doors, the metal could be directly drilled or otherwise utilized to attach mounting brackets. When there are no metal sheets, as is the case in described embodiments, the mounting brackets provide structural support for the hardware to reduce stress on the acrylic outer surface. The acrylic outer surface may be applied to the core to create seamless front, back, and side panels.

It is further noted that the acrylic outer surface may comprise a solid surface acrylic material. The acrylic material may comprise an appropriate color or pattern (e.g., wood grain, faux stone, etc.) as requested by a user. As such, users may request and receive a wide range of colored doors, patterned doors, or the like. Any of these colors can be applied to a door core to satisfy a customer's requirements. Moreover, custom colors and shapes, including curved or radial shapes, may be formed with the acrylic outer surfaces.

Figure 3:
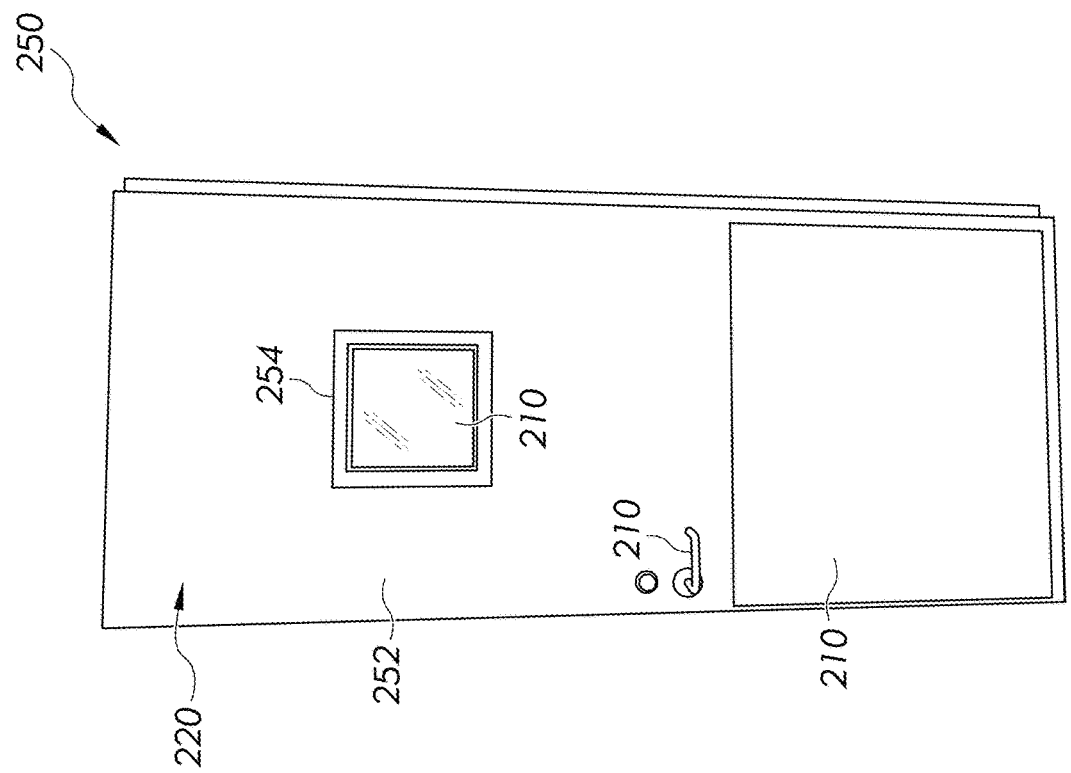
FIG. 3 is a front view of a hollow acrylic solid surface seamless man door that is not installed in a doorframe in accordance with various embodiments described here.
Figure 2:
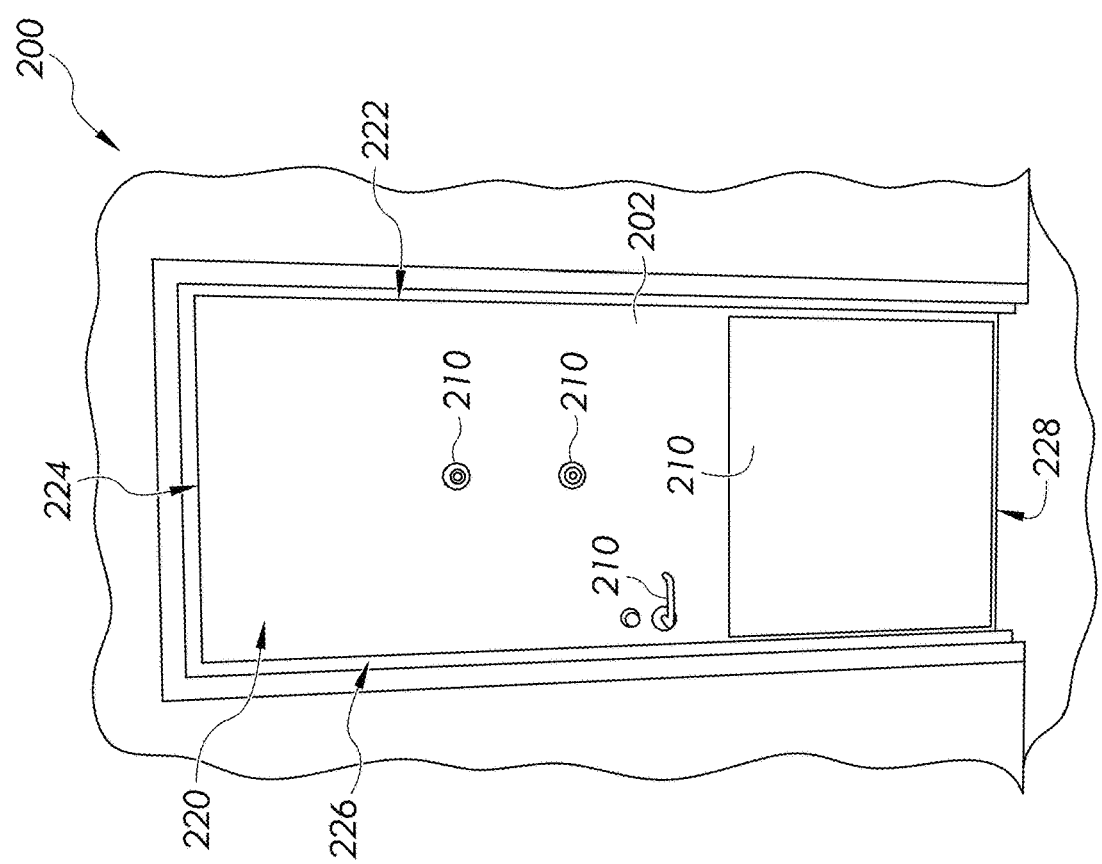
FIG. 2 is a front view of a hollow acrylic solid surface seamless man door installed in a doorframe.

Turning now to FIGS. 2 and 3, there are exemplary embodiments of acrylic doors 200 and 250, in accordance with various aspects disclosed herein. Acrylic door 200 is shown as installed within a door frame of a building, while acrylic door 250 is shown in an uninstalled state. It is noted that the acrylic doors 200 and 250 may comprise similar or the same components with the exception of different hardware 210. The hardware 210 may include locks, bolts, windows, view holes, hinges, opening devices (e.g., handles, push bars, knobs, etc.), foot pads, or the like. It is noted that embodiments may allow for use or any desired hardware.

In some instances, as described in more detail below, the acrylic doors 200 and 250 may include electronic devices and accompanying wired or wireless connections. For instance, embodiments may include automated door opening or closing devices, user devices, or the like. User devices, as described in more detail herein, may include a tablet computer. The tablet computer may be integrated within the door or communicatively interacting with the door. The tablet computer may be utilized as a viewer or to unlock the door such as through a passcode, biometrics (e.g., facial recognition, finger print recognition, voice recognition, or the like), or provide interaction with a user device (e.g., NFC communication with a user's cellular phone and the integrated user device). In an example, the tablet computer includes a display screen that is communicatively coupled to a camera, such as a video camera of a still-motion camera. The tablet computer can display, via the display device, captured image data to allow a user to view images captured by the camera. The camera may be integrated within the door, may be mounted in a facility, or may be located in other appropriate areas.

In embodiments, the acrylic doors 200 and 250 may include outer acrylic surfaces 202 and 252. It is noted that the outer acrylic surfaces 202 and 252 may comprise an acrylic material and may comprise monolithic acrylic panels formed together to create a seamless and solid outer surface. In examples, one or more sides of the door may comprise its own acrylic sheet that is then attached (e.g., seamed, adhered, fastened, or otherwise joined) to other sheets to form entire outer acrylic surfaces 202 and 252. For instance, the views shown in FIGS. 2 and 3 illustrate a first side 220 of a door. This side of the door may comprise a first sheet of acrylic that is seamless and uniform. The first side may be attached to second side 222, third side 224, fourth side 226, and fifth side 228. A sixth side, not shown, is generally opposite the first side 220 and may comprise a generally similar size and shape as the first side 220.

Exemplary embodiments may utilize any shape, color, or thickness of acrylic sheets as desired. For instance, embodiments may include white acrylic sheets that are about ¼ inch thick. This may allow for a desirable weight to strength ratio. It is noted that different thicknesses may be utilized for different applications or for different types of acrylic.

It is noted, however, that one or more of the sides may be uniformly formed with one or more other sides. For instance, the first side 220, second side 222, and forth side 226 may comprise a single sheet of acrylic that is generally U-shaped. In other examples, sheets of acrylic may be L-shaped, or the like. It is noted that various different sides may be monolithic with various other sides in any appropriate combination.

With reference to FIG. 3, the outer acrylic surface 252 may include a first side 220 comprising a frame 254 for the hardware 210, in this case a viewing window. The frame 254 may comprise a single monolithic piece of acrylic that may be attached to the front side 220. In some embodiments, the frame 254 and the front side 220 may comprise a unitary construction wherein the frame 254 may protrude from or extend within the front side 220. In at least some examples the frame 254 and hardware 210 may comprise other materials, such as metal.

Figure 5:
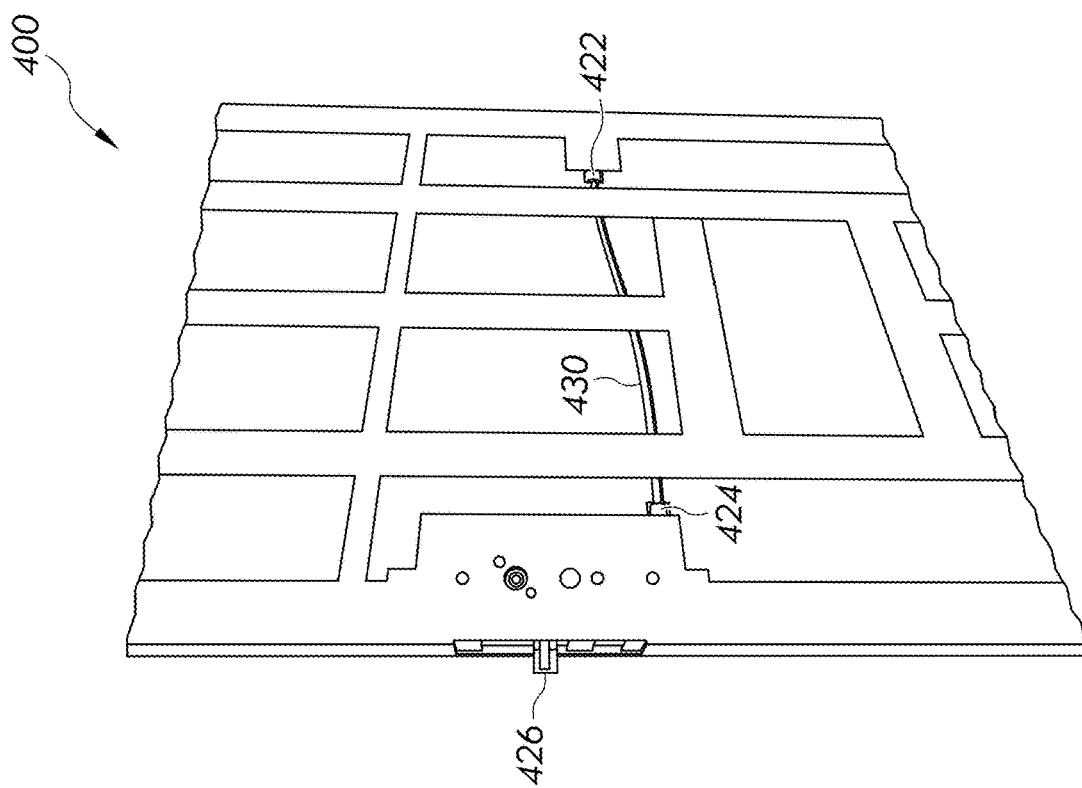
FIG. 5 is another perspective view of a core of a hollow acrylic solid surface seamless man door of FIG. 2 or 3 in accordance with various embodiments described here.
Figure 4:
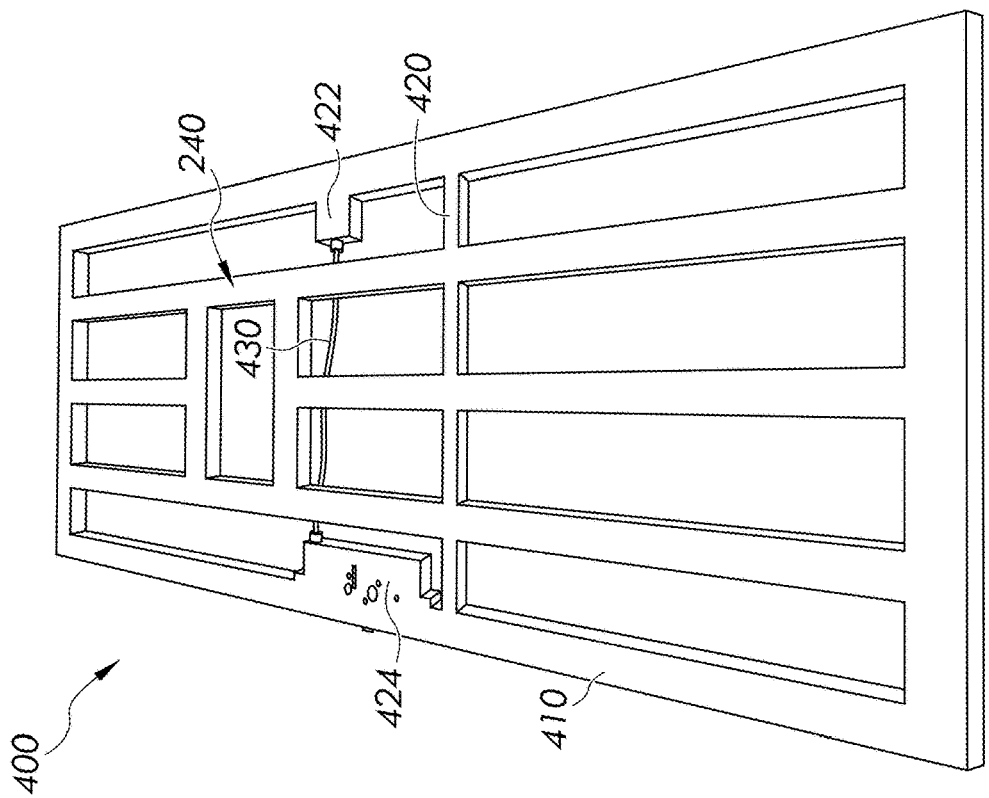
FIG. 4 is a perspective view of a core of a hollow acrylic solid surface seamless man door of FIG. 2 or 3 in accordance with various embodiments described here.

Referring now to FIGS. 4-5, there are views of an inner core 400. The inner core may comprise a frame or supporting structure for the acrylic outer surface. It is noted that the inner core may comprise vertical support beams 410 and horizontal support beams 420. The core may comprise any number of vertical support beams 410 and horizontal support beams 420, such as i vertical support beams 410 and j horizontal support beams 420, where i and j are numbers. It is further noted that the core 400 may include other or different support beams, such as diagonal beams, or the like. In some instances, the vertical and horizontal support beams 410 and 420 may form inner frames or supports 420 that may allow for the mounting of viewing windows, user devices (e.g., tablets) or the like.

The vertical support beams 410 and horizontal support beams 420 may comprise any appropriate material, such as plastics, metals, or natural materials. In at least some embodiments, a metal core may comprise steel, aluminum, titanium, magnesium, brass, other metals, and their alloys. In an example, the support beams 410 and 420 may comprise solid beams, hollow beams, or a combination thereof. For example, the support beams 410 and horizontal support beams 420 may comprise ¼ inch aluminum channel beams. The support beams 410 and 420 may be monolithically formed or attached together in an appropriate manner, such as with fasteners, adhesives, magnets, welding, or the like.

Figure 6:
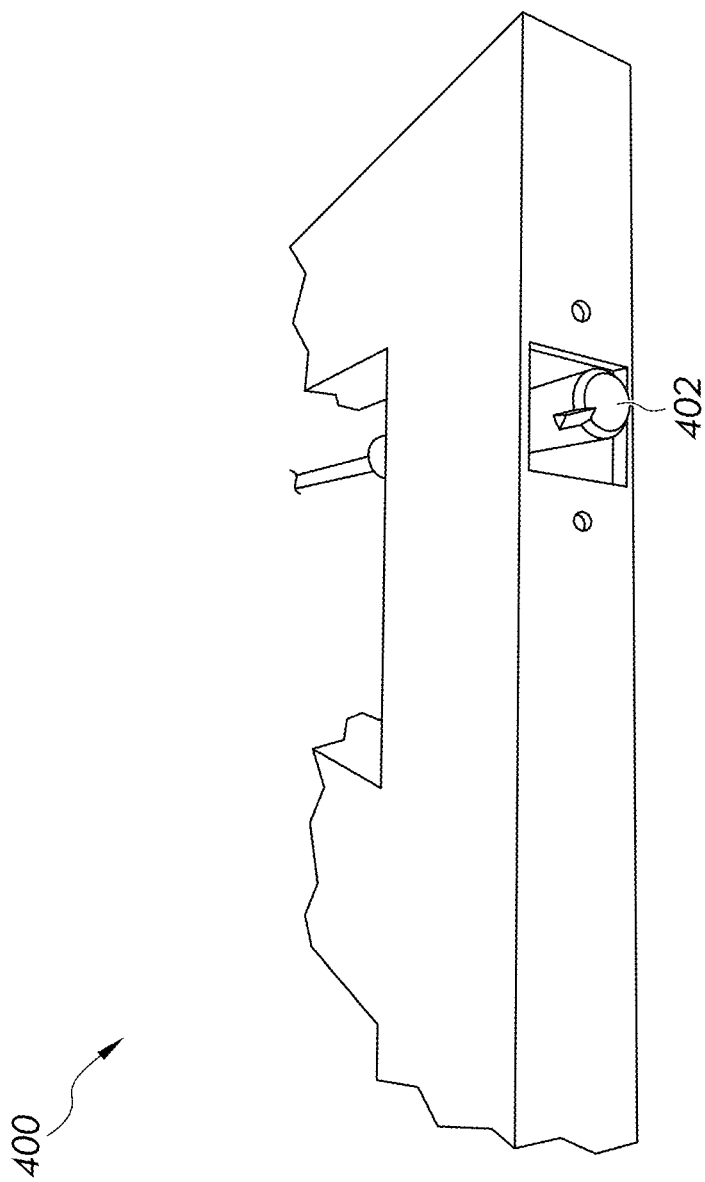
FIG. 6 is a side perspective view of hardware installed to the core of a hollow acrylic solid surface seamless man door of FIG. 2 or 3 in accordance with various embodiments described here.
Figure 7:
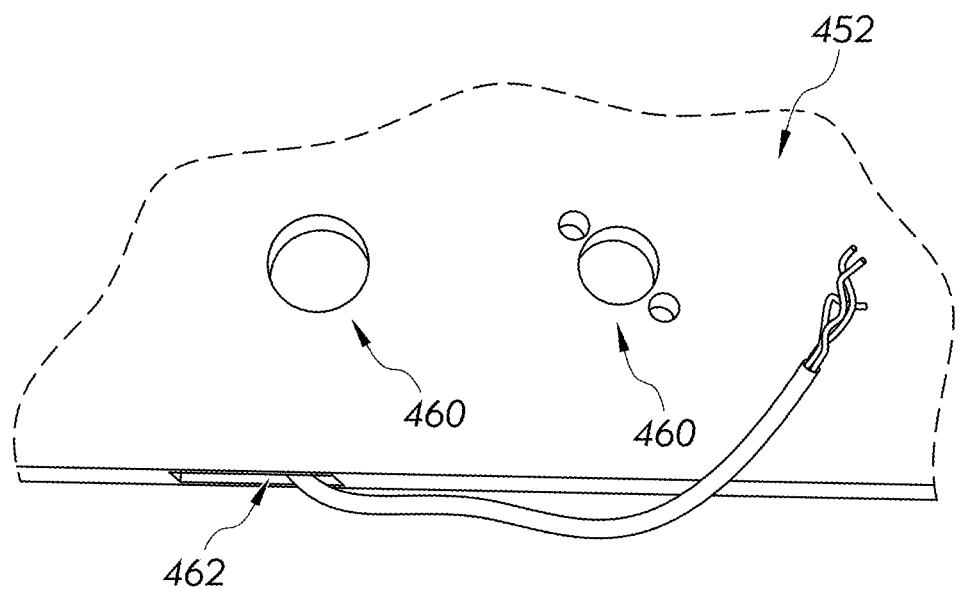
FIG. 7 is a sectional view of through holes formed in an acrylic surface of the hollow acrylic solid surface seamless man door of FIG. 2 or 3 in accordance with various embodiments described here.

According to at least one embodiment, mounting brackets (e.g., mounting brackets 422, 424) may be selectively positioned according to desired locations of hardware. As described herein, any number and combination of hardware may be utilized. In FIGS. 4 and 5, a first mounting bracket 422 and a second mounting bracket 424 are illustrated. The first mounting bracket 422 may be positioned to allow for electrical connections from the core 400 to a power source (e.g., battery, power mains, etc.). The second mounting bracket 424 may be positioned for receiving a lockset, latch 426, opening device, powered locking/unlocking mechanism, and the like. It is noted that mounting brackets 422, 424 may be attached to the core 400 in an appropriate manner, such as with fasteners, adhesives, magnets, welding, or the like. Some hardware, likewise, may be attached or installed within the core, such as hardware 402 shown in FIG. 6.

It is further noted that the mounting brackets 422, 424 may include, or may be machined to include, appropriate through holes, connections, and the like. In an example, an electrical conduit may be formed through one or more support beams 410 and 420, such that an insulated wire may pass through the conduit and provide power between mounting brackets 422 and 424.

It is noted that the mounting brackets may comprise additional or other materials, shapes, or constructions. For instance, the mounting brackets may include aluminum, zinc, iron, alloys, or the like. In some instances, the mounting brackets may include laminated cores comprising plastics (e.g., polyurethane), foamable material, or the like.

Referring now to FIGS. 7-10, there are images of an outer acrylic surface 452 during various stages of assembly with a core 400. Once the core 400, mounting brackets 422, 424, and any hardware are assembled, the outer acrylic surface (e.g., outer acrylic surface 202, 252) may be applied to the core 400.

Figure 8:
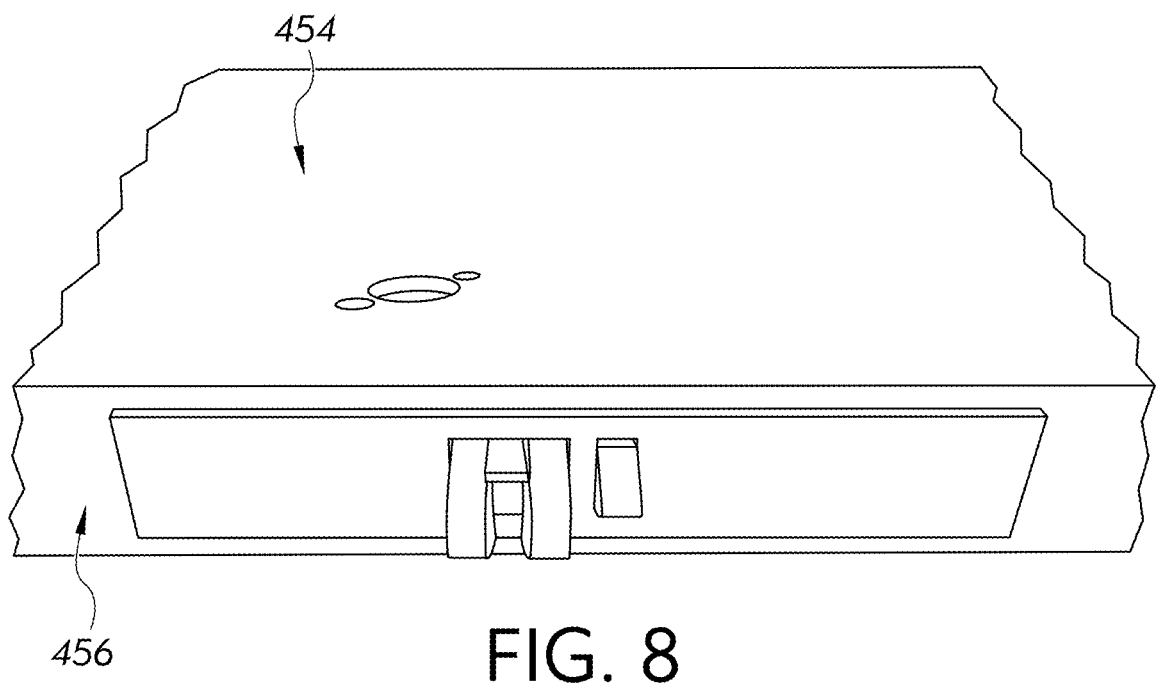
FIG. 8 is a side perspective view showing a seamless acrylic surface of the hollow acrylic solid surface seamless man door of FIG. 2 or 3 in accordance with various embodiments described here.
Figure 9:
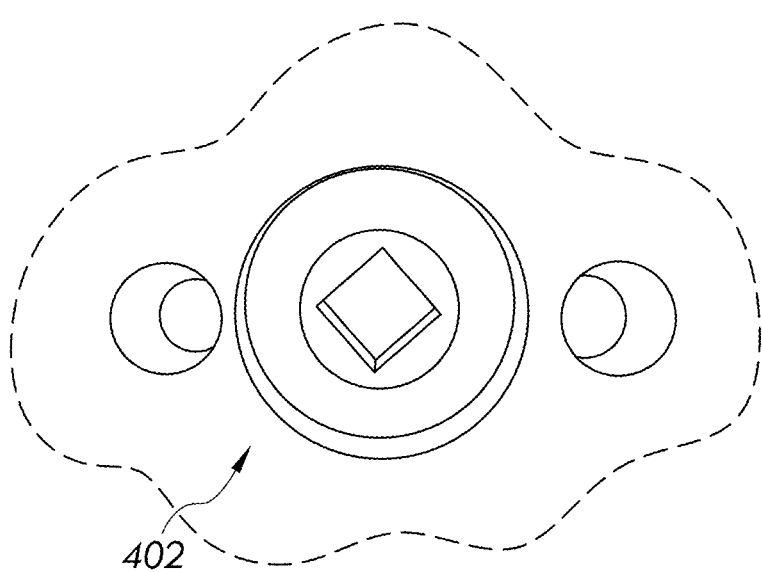
FIG. 9 is a side perspective view of hardware installed to the core of a hollow acrylic solid surface seamless man door of FIG. 2 or 3 in accordance with various embodiments described here.
Figure 10:
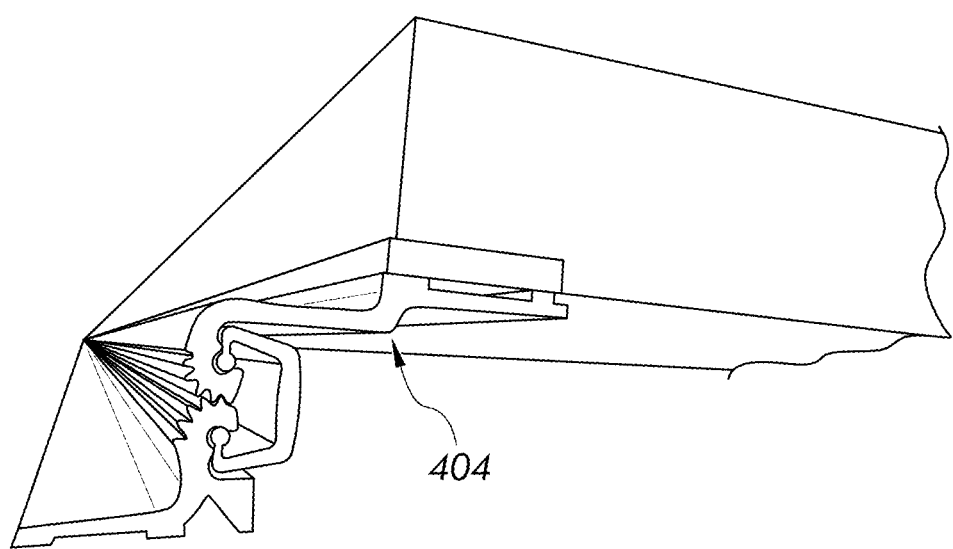
FIG. 10 is a top perspective view of a hinge installed to the core of a hollow acrylic solid surface seamless man door of FIG. 2 or 3 in accordance with various embodiments described here.

The outer acrylic surface 452 may include any number of sides (e.g., 4, 6, etc.), such as a first side 454 and a second side 456. As shown in FIG. 8, the first side 454 and second side 456 may be visually seamless. This may be accomplished through seaming together two sheets of acrylic or forming acrylic to have one or more sides. It is noted that some alternative embodiments may include acrylic surfaces on some but not all sides (e.g., not on the bottom side). It is noted that the outer acrylic surface 452 may include through holes or other formations 460 to allow hardware to be fastened or otherwise attached to the door, such as mounting brackets 422, 424. In some example, a through hole 462 is illustrated as allowing an insulated wire to pass therethrough and into the core 400. FIGS. 9 and 10 likewise illustrate hardware 402 disposed or attached through an appropriate through-hole 460, including a hinge 404 attached via various through-holes and fasteners.

If the door becomes severely scratched it can be sanded and buffed out to look like new again. In some examples, a filling material may be utilized to fill the scratch area with a clear or pigmented composition that may cure within the scratch area. As such, disclosed doors may provide significant advantages and improvements over traditional metal doors.

Figure 11:
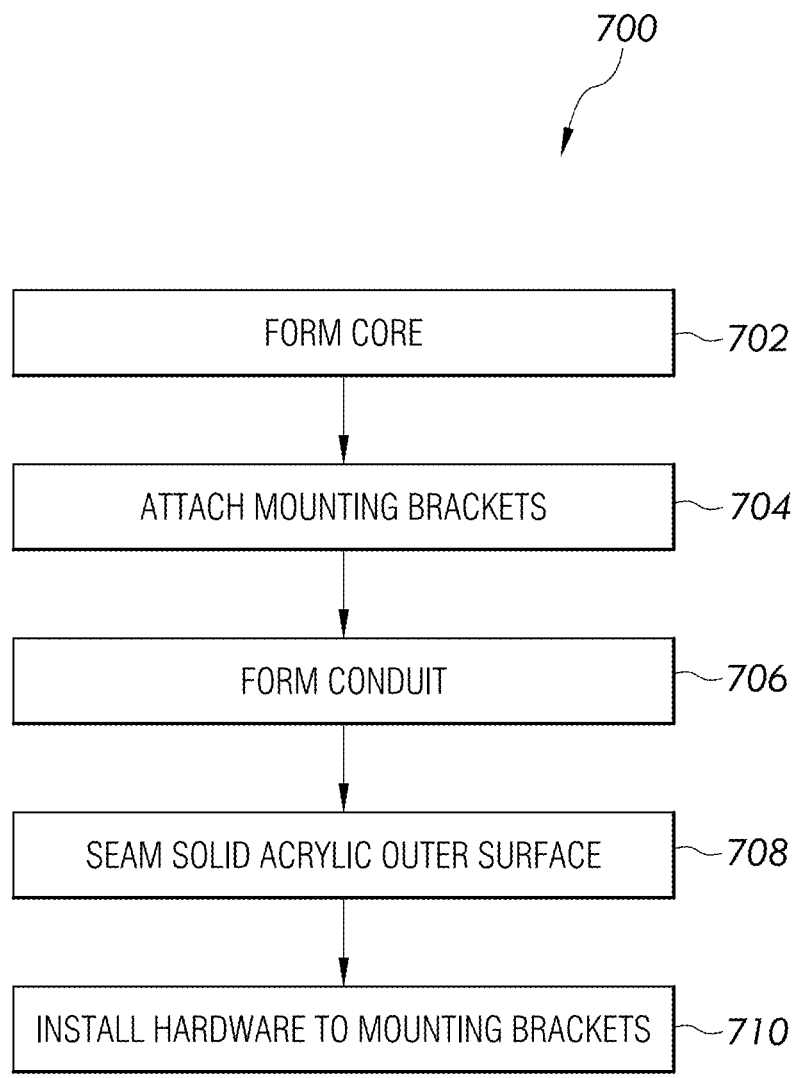
FIG. 11 is method of manufacturing a hollow acrylic solid surface seamless man door in accordance with various embodiments described here.

The construction and arrangement of the various described portions may allow for manufacture or assembly of a hollow acrylic door as described in FIG. 11. It is noted that various disclosed methods may be utilized for manufacturing. Moreover, actions may be automated, manual, or a combination of automated and manual. In some embodiments, the order of operations may be changed or some actions may be different or omitted.

At 702, the manufacturing process 700 may include forming a core as described herein. The core may be formed by adjoining together support beams, such as welding aluminum support beams, to form the core.

At 704, the manufacturing process 700 may include attaching mounting brackets to desired locations of the core. This may allow for later installation of hardware.

At 706, the manufacturing process 700 may include forming a conduit to the core or the mounting brackets. For instance, a conduit may be attached to accommodate locksets that require power or integrated electronics (e.g., a user device). As an example, lighting fixtures may be installed or integrated within the door.

At 708, the manufacturing process 700 may include attaching acrylic sheets to the core and seaming the acrylic around the core such that a seamless acrylic outer surface is formed. It is noted that reference number 708 may include drilling and tapping all hardware, sanding or polishing to a desired finish, and the like.

At 710, the manufacturing process 700 may include installing any remaining hardware. Once completed, the door may be shipped or installed. When the door becomes dirty it can simply be wiped clean. In other instances, the door may be buffed or polished to remove blemishes. Moreover, some embodiments may include applying a filler material to scratches or dents.

Figure 12:
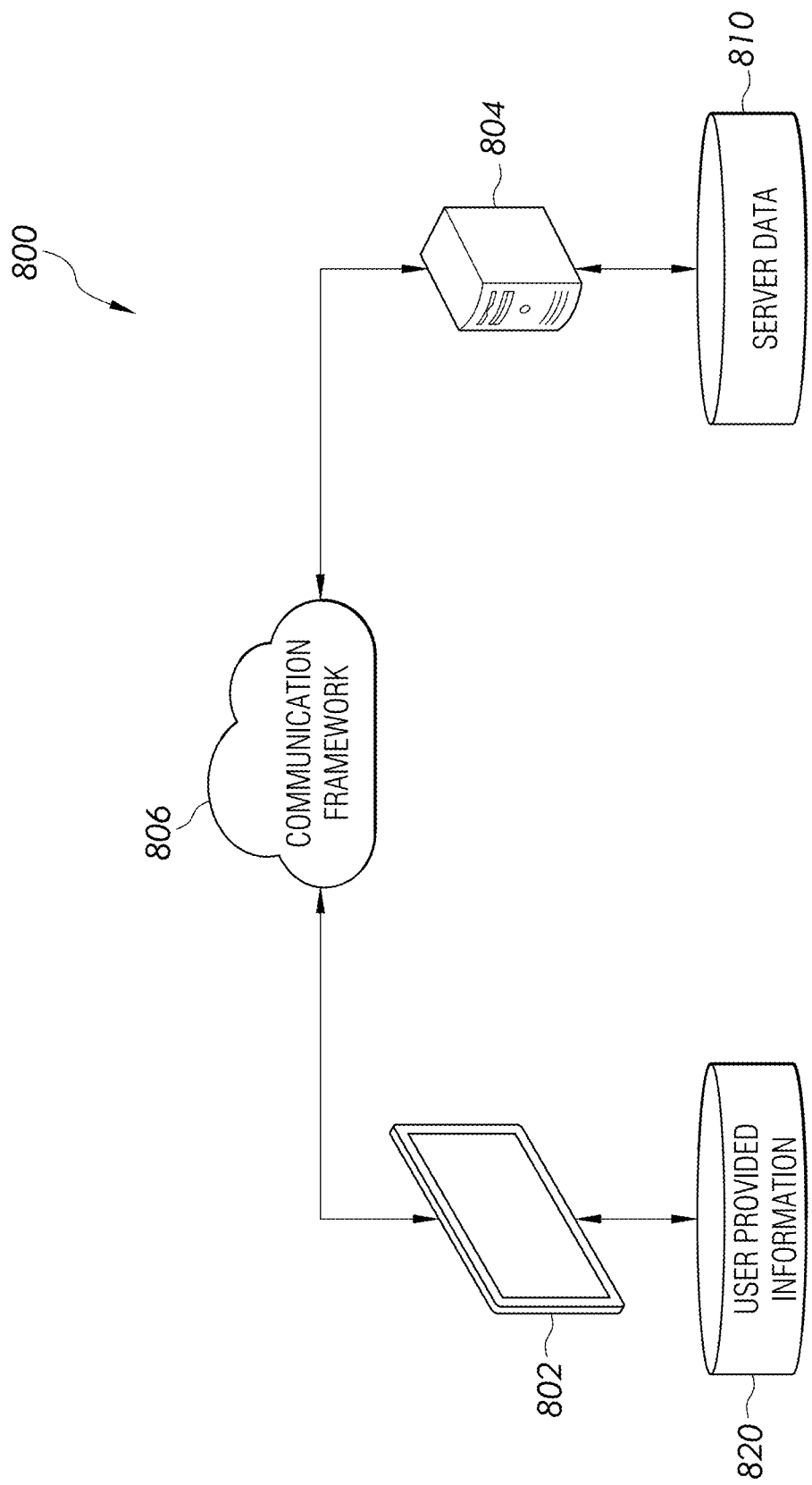
FIG. 12 is an environmental diagram of an exemplary communication system in accordance with various embodiments disclosed herein.

FIG. 12 is a schematic diagram of a computing environment 1100 in accordance with various disclosed aspects. It is noted that the environment 800 may include various other components or aspects. As depicted, the system 800 may include one or more client(s) 802, one or more server(s) 804, one or more client data store(s) 820 or 810, and a communication framework 806.

In an example, a hollow acrylic door may include a user device disposed therein. For instance, the hollow acrylic door may include a tablet computer as a client 802. The client 802 may receive user provided information, such as biometric data (facial recognition, finger print, etc.), passcodes or the like. The client 802 may communicate with a server 804 to determine whether to unlock, lock, or otherwise perform a function based on the user provided information. It is noted that, in some embodiments, the client 802 may include an internal rights management system such that the client 802 need not interact with a server 804.

In at least one embodiment, the client 802 may monitor user activity (e.g., entry or exit), and may log user activity for security events. For instance, the client 802 may monitor entry or exit into a secured location or a location containing valuable items or information. In the event of a breach, the log maintained by the client 802 may be utilized to identify possible suspects. It is noted that the log may be stored on a server 804, or the like.

While depicted as one or more tablet computers, the client(s) 802 may include various other devices that may comprise hardware and/or software (e.g., program threads, processes, computer processors, non-transitory memory devices, etc.). In an example, the client(s) 802 may include laptop computers, smart phones, monitor computers, wearables etc., either integrated with a hollow door or separate therefrom. The client(s) 802 may include or employ various aspects disclosed herein. For example, the client(s) 802 may include or employ all or part of various systems and processes disclosed herein. For instance, embodiments including media capturing devices integrated with a hollow door may be utilized within a network to allow the media capturing device to send an image to a client 802.

Likewise, the server(s) 804 may include various devices that may comprise hardware and/or software (e.g., program threads, processes, computer processors, non-transitory memory devices, etc.). The server(s) 804 may include or employ various aspects disclosed herein. For example, the server(s) 804 may include or employ all or part of various systems and processes disclosed herein. It is noted that the server(s) 804 and the client(s) 802 may communicate via a communication framework 806. In an exemplary communication, the client(s) 802 and server(s) 804 may utilize packaged data (e.g., data packets) adapted to be transmitted between two or more computers. For instance, data packets may include coded information associated with sending or receiving media to or from a hollow door.

A communication framework 806 may comprise various network devices (e.g., access points, routers, base stations, etc.) that may facilitate communication between the client(s) 802 and server(s) 804. It is noted that various forms of communication may be utilized, such as wired (e.g., optical fiber, twisted copper wire, etc.) and/or wireless (e.g., cellular, Wi-Fi, near field communication, etc.) communications.

In various embodiments, the client(s) 802 and server(s) 804 may respectively include, or communicate with, one or more client data stores 820 or 810. The data stores may store data local to the client(s) 802 or server(s) 804.

In at least one embodiment, a client of the client(s) 802 may transfer data describing a recipe, user account data, ratings, or the like to a server of the server(s) 804. The server may store the data and/or employ processes to alter the data. For example, the server may transmit the data to other clients of the client(s) 802.

Figure 13:
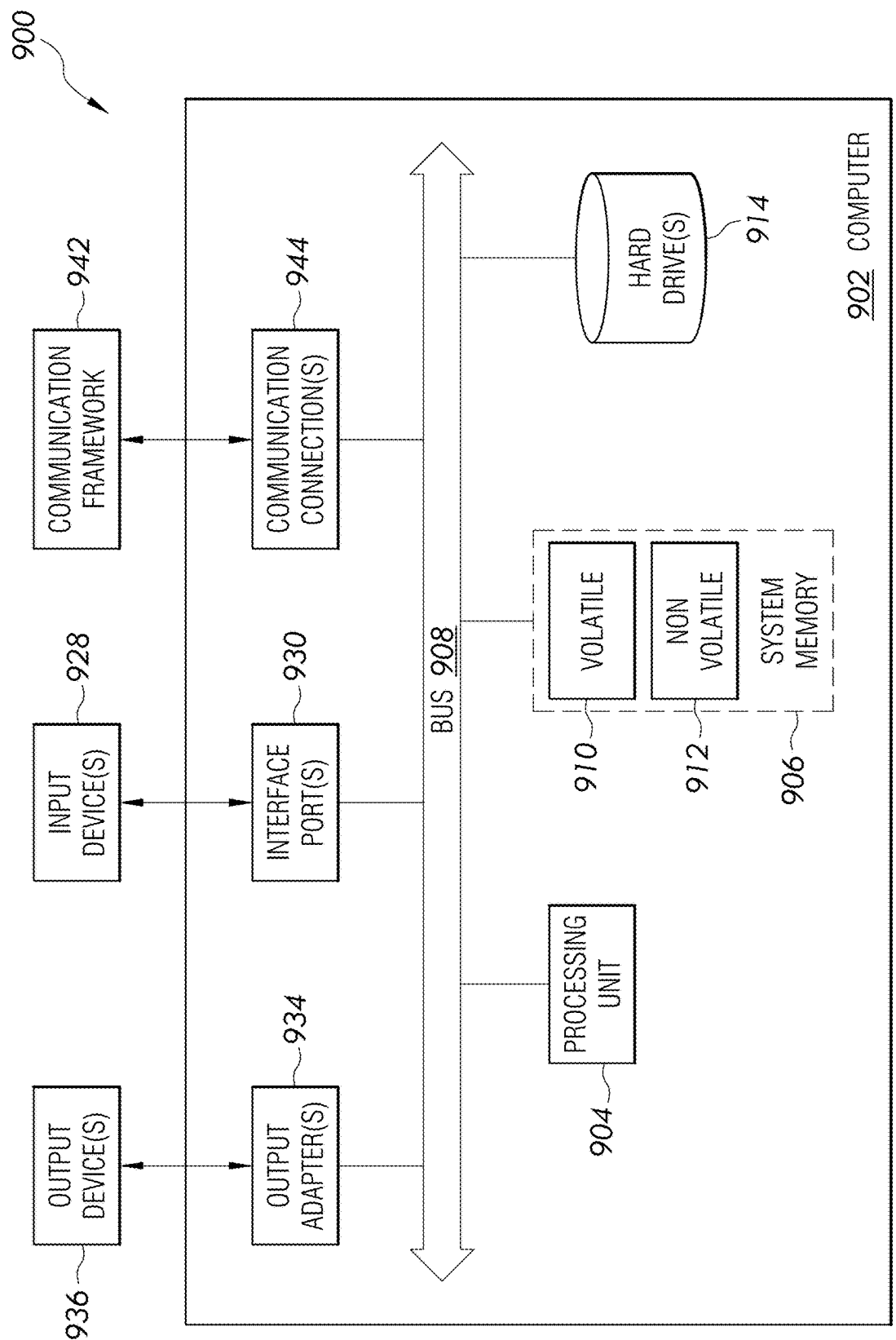
FIG. 13 is a block diagram of a functional computer system in accordance with various embodiments described here.

FIG. 13 is a block diagram of a computer system 900 that may be employed to execute various disclosed embodiments. For instance, the computer system 900 may comprise an electronic user device integrated within a hollow door. It is noted that various components may be implemented in combination with computer executable instructions, hardware devices, and/or combinations of hardware and software devices that may be performed by a computer system 900.

A computer system 900 may include various components, hardware devices, software, software execution, and the like. In embodiments, a computer system 900 may include a system bus 908 that couples various system components. Such components may include a processing unit(s) 904, system memory device(s) 906, disk storage device(s) 914, sensor(s) 935, output adapter(s) 934, interface port(s) 930, and communication connection(s) 944. One or more of the various components may be employed to perform aspects or embodiments disclosed herein. In an aspect, the computer system 900 may "learn," such as described above, user preferences based upon modifications of recipes by users through the rating of recipes, both positively and negatively. For example, the computer system 900 may modify a particular recipe (or a set thereof), if the majority of users, or supermajority thereof, have disapproved of the recipe (such as for taste, texture, consistency, temperature, or a variety of these factors). The computer system 900 may dynamically push out the revised recipe or receive the revised recipe as applicable.

The processing unit(s) 904 may comprise various hardware processing devices, such as single core or multi-core processing devices. Moreover, the processing unit(s) 904 may refer to a "processor," "controller," "computing processing unit (CPU)," or the like. Such terms generally relate to a hardware device. Additionally, the processing unit(s) 904 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or the like.

System memory 906 may include one or more types of memory, such as volatile memory 910 (e.g., random access memory (RAM)) and non-volatile memory 912 (e.g., read-only memory (ROM)). ROM may include erasable programmable ROM (EPROM) or electrically erasable programmable ROM (EEPROM). In various embodiments, the processing unit(s) 904 may execute computer executable instructions stored in system memory 906, such as operating system instructions and the like.

The computer 902 may also have one or more hard drives 914 (e.g., EIDE, SATA). While the hard drive(s) 914 are depicted as internal to the computer 902, it is noted that the hard drive(s) 914 may be external and/or coupled to the computer 902 via remote connections. Moreover, the input port(s) 930 may include interfaces for coupling to input device(s) 928, such as disk drives. Disk drives may include components configured to receive, read and/or write to various types of memory devices, such as magnetic disks, optical disks (e.g., compact disks and/or other optical media), flash memory, zip drives, magnetic tapes, and the like.

It is noted that hard drive(s) 914 and/or other disk drives (or non-transitory memory devices in general) may store data and/or computer-executable instructions according to various described embodiments. Such memory devices may also include computer-executable instructions associated with various other programs or modules. For instance, the hard drives(s) 914 may include operating system modules, application program modules, and the like. Moreover, aspects disclosed herein are not limited to a particular operating system, such as a commercially available operating system.

The input device(s) 928 may also include various user interface devices or other input devices, such as sensors (e.g., microphones, pressure sensors, light sensors, etc.), scales, cameras, scanners, facsimile machines, and the like. A user interface device may generate instructions associated with user commands. Such instructions may be received by a computer 902. Examples of such interface devices include a keyboard, mouse (e.g., pointing device), joystick, remote controller, gaming controller, touch screen, stylus, and the like. The input port(s) 930 may provide connections for the input device(s) 928, such as via universal serial ports (USB ports), infrared (IR) sensors, serial ports, parallel ports, wireless connections, specialized ports, and the like.

The output adapter(s) 934 may include various devices and/or programs that interface with the output device(s) 936. The output device(s) 936 may include LEDs, computer monitors, touch screens, televisions, projectors, audio devices, printing devices, or the like.

In embodiments, a computer 902 may be utilized as a client and/or a server device. As such, the computer 902 may include communication connection(s) 944 for connecting to a communication framework 942. The communication connection(s) 944 may include devices or components capable of connecting to a network. For instance, the communication connection(s) 944 may include cellular antennas, wireless antennas, wired connections, and the like. The communication connection(s) 944 may connect to networks via a communication framework 942. The networks may include wide area networks, local area networks, facility or enterprise wide networks (e.g., intranet), global networks (e.g., Internet), satellite networks, and the like.

The terms "component," "module," "system," "interface," "platform," "service," "framework," "connector," "controller," or the like are generally intended to refer to a computer-related entity. Such terms may refer to at least one of hardware or software. For example, a component may include a computer process running on a processor, a processor, a device, a process, a computer thread, or the like. In another aspect, such terms may include both an application running on a processor and a processor. Moreover, such terms may be localized to one computer and/or may be distributed across multiple computers.

Moreover, terms such as "access point," "server," and the like, are utilized interchangeably, and refer to a network component or appliance that serves and receives control data, voice, video, sound, or other data-stream or signaling-stream. Data and signaling streams may be packetized or frame-based flows. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). Still further, "user," "customer," "consumer," may include a commercial establishment(s).

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

A network typically includes a plurality of elements that host logic. In packet-based wide-area networks (WAN), servers (e.g., devices comprising logic) may be placed at different points on the network. Servers may communicate with other devices and/or databases. In another aspect, a server may provide access to a user account. The "user account" includes attributes for a particular user and commonly include a unique identifier (ID) associated with the user. The ID may be associated with a particular mobile device and/or blender device owned by the user. The user account may also include information such as relationships with other users, application usage, location, personal settings, and other information.

Embodiments may utilize substantially any wired or wireless network. For instance, embodiments may utilize various radio access networks (RAN), e.g., Wi-Fi, global systems for mobile communications, universal mobile telecommunications systems, worldwide interoperability for microwave access, enhanced general packet radio service, third generation partnership project long term evolution (3G LTE), fourth generation long term evolution (4G LTE), third generation partnership project 2, BLUETOOTH®, ultra mobile broadband, high speed packet access, xth generation long term evolution, or another IEEE 802.XX technology. Furthermore, embodiments may utilize wired communications.

It is noted that terms "user equipment," "device," "user equipment device," "client," and the like are utilized interchangeably in the subject application, unless context warrants particular distinction(s) among the terms. Such terms may refer to a network component(s) or appliance(s) that sends or receives data, voice, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand held gaming counsels, wearables (e.g., smart watches), desktop computers, etc.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network may include packet-based communications, radio and frequency/amplitude modulation networks, and the like. Communication may be enabled by hardware elements called "transceivers." Transceivers may be configured for specific networks and a user equipment device may have any number of transceivers configured for various networks. For instance, a smart phone may include a cellular transceiver, a Wi-Fi transceiver, a BLUETOOTH® transceiver, or may be hardwired. In embodiments in which it is hardwired, any appropriate kind or type of networking cables may be utilized. For example, USB cables, dedicated wires, coaxial cables, optical fiber cables, twisted pair cables, Ethernet, HDMI and the like.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define a hollow door as disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Aspects Listing:

Aspect 1. A hollow man door comprising: a core comprising metal; one or more mounting brackets selectively attached to the core, wherein the one or more mounting brackets are positioned for attaching hardware to the hollow man door; and an acrylic outer surface attached to and generally encasing the core, wherein the acrylic outer surface comprises a solid seamless surface.

Aspect 2. The hollow man door of the preceding clause, wherein the metal of the core comprises aluminum.

Aspect 3. The hollow man door of any of the preceding clauses, wherein the core comprises one or more support beams and the support beams comprise aluminum.

Aspect 4. The hollow man door of any of the preceding clauses, wherein the acrylic outer surface comprises a thickness of at least one fourth of an inch.

Aspect 5. The hollow man door of any of the preceding clauses, further comprising an electrical conduit formed between a first mounting bracket of the one or more mounting brackets and a second mounting bracket of the one or more mounting brackets.

Aspect 6. The hollow man door of any of the preceding clauses, wherein the electrical conduit includes an insulated wire disposed within the conduit, and wherein the insulated wire is configured to provide power to the first mounting bracket and the second mounting bracket.

Aspect 7. The hollow man door of any of the preceding clauses, further comprising a user device integrated within the hollow man door.

Aspect 8. The hollow man door of any of the preceding clauses, wherein the user device comprises a display device configured to display image data captured by a camera.

Aspect 9. The hollow man door of any of the preceding clauses, wherein the user device comprises a tablet computer.

Aspect 9. The hollow man door of any of the preceding clauses, wherein the user device includes a biometric scanner configured to receive biometric information from a user for determining authorization to open the hollow man door.

Aspect 11. The hollow man door of any of the preceding clauses, further wherein the acrylic outer surface includes a seamless front surface, a seamless back surface, and a plurality of seamless side panel surfaces.

Aspect 12. The hollow man door of any of the preceding clauses, wherein the seamless front surface is seamlessly coupled to the plurality of seamless side panel surfaces, and wherein the seamless back surface is coupled to the plurality seamless side panel surfaces Aspect 13. The hollow man door of any of the preceding clauses, further wherein the acrylic outer surface includes a seamless front surface, a seamless back surface, and at least one non-acrylic side surface.

Aspect 14. A method for forming a hollow man door, comprising: forming a core of a metallic material; attaching at least one mounting brackets to the core; forming at least one conduit through the core; and seaming together a plurality of solid acrylic outer surfaces such that the core is disposed within the plurality of solid acrylic outer surfaces.

Aspect 15. The method for forming the hollow man door of any of the preceding clauses, further comprising, installing door hardware to the mounting brackets such that the door hardware is prevented from direct contact with the plurality of solid acrylic outer surfaces.

Aspect 16. The method for forming the hollow man door of any of the preceding clauses, wherein seeming together the plurality of solid acrylic surfaces comprises seeming together a front solid acrylic surface to at least one side acrylic surface, such that the front solid acrylic surface and the at least one side acrylic surface are visually seamlessly joined together.

Aspect 17. The method of forming the hollow man door of claim 14, wherein seeming together the plurality of solid acrylic surfaces comprises seeming together a back solid acrylic surface to at least one side acrylic surface, such that the front solid acrylic surface and the at least one side acrylic surface are visually seamlessly joined together.

Aspect 18. The method of forming the hollow man door of any of the preceding clauses, wherein seeming together the plurality of solid acrylic surfaces comprises seeming together a back solid acrylic surface to at least one side acrylic surface, such that the front solid acrylic surface and the at least one side acrylic surface are visually seamlessly joined together.

Aspect 19. The method of forming the hollow man door of any of the preceding clauses, wherein the at least one conduit provides an electrical path between a first mounting bracket of the at least one mounting brackets and a second mounting bracket of the at least one mounting brackets and Aspect 20. The method of forming the hollow man door of any of the preceding clauses, further comprising installing the hollow man door in a facility.

What is claimed is:

1. A hollow man door comprising:
   a core comprising metal, the core further comprising a frame and at least one of a vertical support beam and a horizontal support beam extending from a first major side of the frame to a second major side of the frame opposite the first major side;
   one or more mounting brackets selectively attached to the core, wherein the one or more mounting brackets are positioned for attaching hardware to the hollow man door; and
   an acrylic outer surface attached to and generally encasing the core, wherein the acrylic outer surface comprises a seamless front surface, a seamless back surface, and a plurality of seamless side panel surfaces, wherein the seamless front surface is visually seamlessly joined to at least one of the plurality of seamless side panel surfaces, wherein the seamless back surface is visually seamlessly joined to at least one of the plurality of seamless side panel surfaces, and wherein at least one of the seamless front surface, the seamless back surface, and the plurality of seamless side panel surfaces comprises at least one acrylic sheet comprising a thickness of at least one fourth of an inch.

2. The hollow man door of claim 1, wherein the metal of the core comprises aluminum.

3. The hollow man door of claim 1, further comprising an electrical conduit formed between a first mounting bracket of the one or more mounting brackets and a second mounting bracket of the one or more mounting brackets.

4. The hollow man door of claim 3, wherein the electrical conduit includes an insulated wire disposed within the conduit, and wherein the insulated wire is configured to provide power to the first mounting bracket and the second mounting bracket.

5. The hollow man door of claim 1, further comprising a user device integrated within the hollow man door.

6. The hollow man door of claim 5, wherein the user device comprises a display device configured to display image data captured by a camera.

7. The hollow man door of claim 5, wherein the user device comprises a tablet computer.

8. The hollow man door of claim 5, wherein the user device includes a biometric scanner configured to receive biometric information from a user for determining authorization to open the hollow man door.

* * * * *